No. 809,165. PATENTED JAN. 2, 1906.
H. S. BEENEY.
BRAKE MECHANISM.
APPLICATION FILED JUNE 28, 1905.
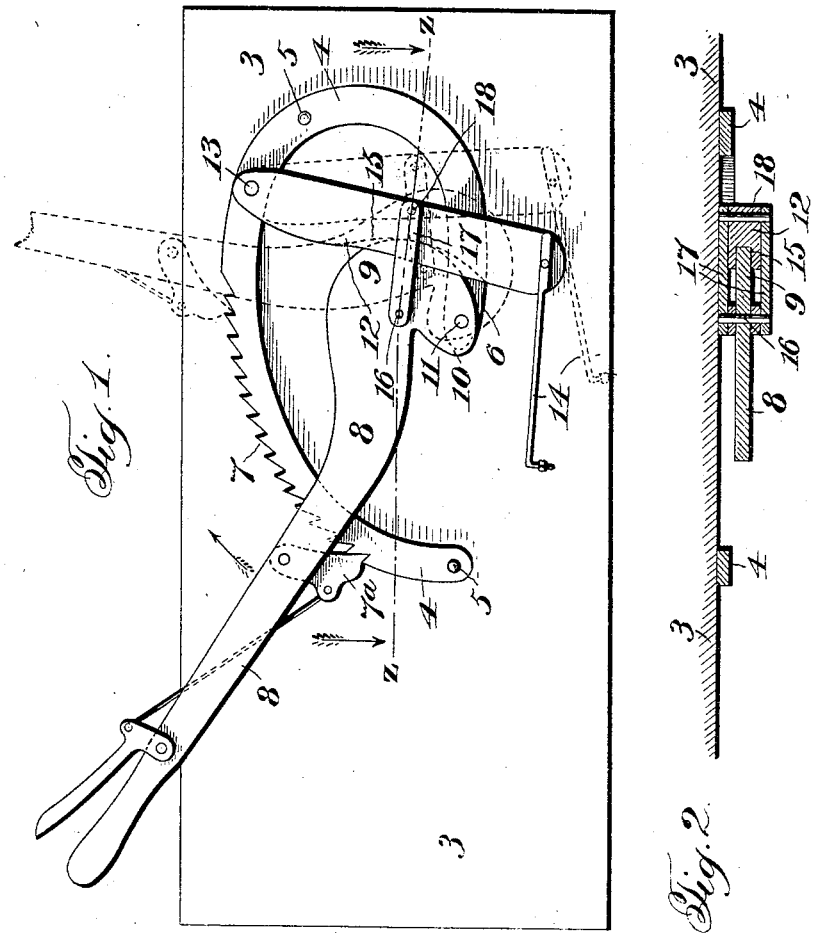
Witnesses:
Jas E. Hutchinson
Calvin T. Milans
Inventor:
Henry S. Beeney,
By Royal E. Burnham, Attorney

UNITED STATES PATENT OFFICE.

HENRY S. BEENEY, OF ELIZA, ILLINOIS.

BRAKE MECHANISM.

No. 809,165.  Specification of Letters Patent.  Patented Jan. 2, 1906.

Application filed June 28, 1905. Serial No. 267,326.

*To all whom it may concern:*

Be it known that I, HENRY S. BEENEY, a citizen of the United States, residing at Eliza, in the county of Mercer and State of Illinois, have invented certain new and useful Improvements in Brake Mechanism, of which the following is a specification, reference being had therein to the accompanying drawings.

This invention relates to power-levers, and especially to those designed for operating braking mechanisms of vehicles, although it is readily susceptible of other uses.

The invention provides simple and effective means which is strong and durable and whereby the initial movement of the brake-shoe against the wheel or the initial movement of any other mechanism operated by the lever is faster with a constant and equal movement of the lever than the after movement when the brake-shoe or other element is thrown into service.

Novel details will be apparent from the detail description hereinafter, when read in connection with the accompanying drawings, forming part hereof, and wherein a preferable embodiment of the invention is disclosed for purposes of illustration.

In the drawings like reference characters refer to corresponding parts in both the views, of which—

Figure 1 is a side view of the brake-lever and associated mechanism, the full lines showing the position of the lever when the brake is off and the dotted lines its position when the brake is on; and Fig. 2 is a sectional view on the line $zz$, Fig. 1.

Referring more particularly to the drawings, 3 designates the side of a wagon-box or other part of a vehicle to which is attached a ratchet-bar 4 by bolts 5, the ratchet-bar being curved, so as to extend one end 6 to a point under teeth 7 of the bar.

One end of a hand-lever 8 is formed with an enlarged and rounded end 9, from which projects laterally a short arm 10, at the end of which on pivot-pin 11 the lever is fulcrumed to the end 6 of the ratchet-bar 4. A manually-operable pawl 7ª is provided on lever 8 for coöperation with teeth 7 of ratchet-bar 4 for the purpose of holding the lever at any point desired. A link 12 is disposed adjacent to lever 8 and is pivoted at its upper end to the upper part of ratchet-bar 4 at 13, and at the lower end of link 12 is pivotally connected a rod or other suitable means 14, which is attached to and operates the brake or other mechanism. In the side of link 12 adjacent to lever 8 is sunk a groove 15, in and against the bottom surface of which the rounded end 9 of the lever seats and is operable. At a point 16 of the lever 8 about midway between the pivot in its arm 10 and its opposite edge are pivotally-connected straps 17, which are pivotally connected at 18 to link 12 about midway of its ends, one of the straps being disposed on each side of the lever and link.

When the brake or other mechanism to be operated is at rest or in ineffective position, connecting-point 16 of straps 17 is substantially above pivot-point 11. Upon movement of the lever in direction of the arrow, Fig. 1, point 16 moves in a circular path with point 11 as a center, and thus moves straps 17, link 12, and connecting means 14 to operate a brake or to attain other desired results. It will be seen that as point 16 thus moves it approaches a position in line between points 11 of the lever and 18 of the link and that therefore the relative movement of the link with respect to that of the free end of the lever decreases as the movement progresses and that the leverage thus increases. The ratchet-and-pawl mechanism 7 and 7ª serves to hold the lever in advanced position in an obvious manner. That part of the rounded end 9 of the lever which seats in groove 15 contacts with the correspondingly-rounded bottom surface of said groove, and as the lever advances the operation of the lever end thereagainst causes the link to move. It will thus be seen that on advance of the lever movement is given to the link by this means just described, as well as by the straps, and that the straps serve to draw the link in the opposite direction on reversal of movement of the lever, and thus let off the mechanism operated by connecting means 14.

Having thus described my invention, what I claim as new, and desire to secure by Letters Patent, is—

1. A lever having a laterally-projecting arm near its end, and on which it is fulcrumed, and a rounded end continuing to the arm, in combination with a pivoted link, and straps connecting said arm and link, whereby said rounded arm end is held in contact with said link.

2. A lever having a laterally-projecting arm near its end and on which it is fulcrumed and a rounded end continuing to the arm, in combination with a pivoted link and means whereby said link is held in contact with said lever, said link having in its side adjacent to the lever a groove in which said rounded lever end is operable.

3. Mechanism of the character described, comprising a ratchet-bar having one end curved under itself, a lever terminating in a laterally-projecting arm and a rounded end continuing to the arm and fulcrumed at the end of the arm to the lower part of said ratchet-bar, a link pivoted to the upper part of said ratchet-bar and having on its side adjacent to the lever a groove in which said rounded lever end is operable, straps connecting said lever and link, means at the lower end of said link whereby the mechanism to be operated is moved, and a pawl on said lever and coöperating with said ratchet-bar.

In testimony whereof I affix my signature in presence of two witnesses.

HENRY S. BEENEY.

Witnesses:
WILLIAM H. BISHOP,
ADNA MILLER.